United States Patent Office 3,437,704
Patented Apr. 8, 1969

3,437,704
SEPARATION OF VINYL AROMATIC
HYDROCARBONS
Rodney D. Beckham, St. Ann, and Earle C. Makin, Jr.,
St. Louis, Mo., and Wilbert H. Urry, Chicago, Ill., assignors to Monsanto Company, St. Louis, Mo., a corporation of Delaware
No Drawing. Filed July 15, 1966, Ser. No. 565,417
Int. Cl. C07c 15/02, 15/10
U.S. Cl. 260—669       10 Claims The present invention relates to a process for the separation of vinyl aromatic hydrocarbons. More particularly, the present invention relates to a process for the separation of vinyl aromatic hydrocarbons according to the linearity of the vinyl substituent of the vinyl aromatic hydrocarbon.

The phrase "vinyl aromatic hydrocarbons" as used herein refers to aromatic hydrocarbons containing a monoethylenically unsaturated alkyl substituent to the aromatic nucleus. "Straight-chain vinyl aromatic hydrocarbons" as used herein refers to those vinyl aromatic hydrocarbons in which the mono-ethylenically unsaturated alkyl substituent is straight-chain, e.g., styrene, vinyl toluene, mono-phenyl propylene, etc. "Non-straight-chain vinyl aromatic hydrocarbons" as used herein, refers to those vinyl aromatic hydrocarbons in which the mono-ethylenically unsaturated alkyl substituent is non-straight-chain, e.g., alpha-methyl styrene, etc.

The separation of vinyl aromatic hydrocarbons is at best quite difficult. Most of the usual complexing agents used for separating vinyl aromatic hydrocarbons from non-vinyl aromatic hydrocarbons are of little use in separating the various vinyl aromatic hydrocarbons one from another since such complexing agents make little distinction between the various vinyl aromatic hydrocarbons. The same problem exists with the solvents which have been found useful for separating vinyl aromatic hydrocarbons from non-vinyl aromatic hydrocarbons. When the vinyl aromatic hydrocarbons represents a wide boiling range, it is often possible to separate such hydrocarbons from one another by ordinary distillation. However, even with distillation, there is always the problem of polymerization and copolymerization of the various vinyl aromatic hydrocarbons within the distillation system. Even with distillation, however, and neglecting the problem of polymerization, it is still quite difficult to separate such close boiling vinyl aromatic hydrocarbons as alpha-methyl styrene and vinyl toluene.

It is an object of the present invention to provide a new and improved process for the separation of vinyl aromatic hydrocarbons. Another object of the present invention is to provide a new and improved process for the separation of vinyl aromatic hydrocarbons according to the linearity of the vinyl substituent of said vinyl aromatic hydrocarbons. Still another object of the present invention is to provide a new and improved process for the separation of straight-chain vinyl aromatic hydrocarbons from non-straight-chain vinyl aromatic hydrocarbons. A particular object of the present invention is to provide a new and improved process for the separation of alpha-methyl styrene from vinyl toluene. Additional objects will become apparent from the following description of the invention herein disclosed.

The present invention which fulfills these and other objects, is a process for the separation of straight-chain vinyl aromatic hydrocarbons from non-straight-chain vinyl aromatic hydrocarbons which comprises contacting a mixture of said straight-chain vinyl aromatic hydrocarbons and said non-straight-chain vinyl aromatic hydrocarbons with a complex comprised of a halogen salt of a noble metal and an aromatic or aliphatic nitrile, thereby forming a second complex comprised of said halogen salt of a noble metal, said nitrile and the straight-chain vinyl aromatic hydrocarbons of said mixture.

By "noble metal" as used herein, is meant a metal selected from the group consisting of platinum, palladium, iridium, ruthenium, osmium, and rhodium. In the preferred practice of the present invention, the halogen salt of a noble metal is a halogen salt of palladium or platinum. Preferably, the noble metal is palladium.

The halogen of the halogen salt of a noble metal may be chlorine, bromine, iodine, fluorine or combinations of these. Usually, however, the halogen salt will include either chlorine or fluorine as the halogen with chlorine being preferred over fluorine. The most useful of the halogen salts of noble metals are platinous chloride and palladous chloride with the latter being preferred over the former.

The nitriles useful in the present invention include both aromatic and aliphatic nitriles. The aromatic nitriles are such compounds as benzonitrile, as well as those aromatic nitriles having substituents to the aromatic nucleus other than the nitrile group, particularly alkyl substituents. Also included in the aromatic nitriles useful in the present invention are those in which the nitrile-containing substituent to the aromatic nucleus contains 1 to 10 carbon atoms and higher. Among such aromatic nitriles are benzonitrile, phenylacetonitrile, alkyl derivatives of benzonitrile and phenylacetonitrile where the alkyl group is substituted on the benzene ring and the alkyl group contains 1 to 5 carbon atoms. The aromatic nitriles most useful in carrying out the process of the present invention are those containing alkyl substituents of no greater than 3 carbon atoms per substituent and the aromatic nitriles in which the nitrile-containing substituent contains no greater than 3 carbon atoms. Preferably, the aromatic nitrile is one containing no more than 1 alkyl substituent, said alkyl substituent containing no more than 3 carbon atoms, and/or in which the nitrile-containing substituent has no more than 3 carbon atoms. Within this latter group, the preferred aromatic nitrile is benzonitrile. The aliphatic nitriles include naphthenic nitriles, straight-chain and branched-chain alkyl nitriles. Usually, the aliphatic nitrile is one containing no greater than 10 carbon atoms. Included within the useful aliphatic nitriles are the following non-limiting examples of such nitriles: acetonitrile, propionitrile, butyronitrile, isobutyronitrile, valeronitrile, isovaleronitrile, pivalonitrile, capronitrile, caprylonitrile, caprionitrile, etc. The aliphatic nitriles most useful in the practice of the present invention are the alkyl nitriles, particularly the straight-chain alkyl nitriles having 2 to 6 carbon atoms in the alkyl radical. Within this particularly useful group of aliphatic nitriles are such compounds as acetonitrile, propionitrile, butyronitrile, valeronitrile and capronitrile. Usually, the aromatic nitriles are preferred over the aliphatic nitriles due to the fact that the metal halide-aliphatic nitrile complexes are difficulty soluble in the aromatic solvents and mixtures, whereas the metal halide-aromatic nitrile complexes are significantly more soluble in such solvents and mixtures.

The metal halide-nitrile complex by means of which the straight-chain vinyl aromatic hydrocarbons are separated from the non-straight-chain vinyl aromatic hydrocarbons in accordance with the present invention, is prepared by reacting the metal halide with the nitrile at elevated temperatures. Usually, temperatures within the range of 60 to 120° C. will suffice, with the actual temperature for the formation of the complex varying, depending upon the choice of metal halide and nitrile. Generally, the complex as formed, is a solid under ordinary conditions. Thus, in order to obtain intimate contact of the hydrocarbon mixture containing the vinyl aromatic hydrocarbons to be separated with the complex, it is usually necessary to dissolve the complex in an inert aromatic hydrocarbon solvent. Among the aromatic solvents which may be used are such compounds as benzene, alkyl benzenes, liquid alkyl naphthalenes and the like. As previously stated, the solvent should be inert to both the vinyl aromatic hydrocarbons and to the complex. Particularly useful hydrocarbon solvents for the complex are such aromatic hydrocarbons as benzene, toluene, xylenes, ethylbenzene, and mixtures thereof.

The temperature at which the metal halide-nitrile complex is contacted with the vinyl aromatic hydrocarbon mixture to be separated is usually within the range of −30 to 180° C. Of course, the optimum contacting temperature will vary depending upon the particular noble metal halide-nitrile complex used and the vinyl aromatic hydrocarbon mixture to be separated. However, such optimum temperatures should be within the above range. A particularly useful range of temperatures for forming the complex between the straight-chain vinyl aromatic hydrocarbons and the noble metal halide-nitrile complex is from about 0° C. to about 60° C.

The pressure at which the process of the present invention is carried out may vary widely, but will usually be within the range of 0.1 to 100 p.s.i.g., pressure not being particularly critical within such range. As a practical matter, however, pressures are generally substantially atmospheric. The length of time necessary for the separation of the straight-chain vinyl aromatic hydrocarbons from the non-straight-chain aromatic hydrocarbons by the process of the present invention will vary considerably depending upon the vinyl aromatic hydrocarbon mixture, the particular noble metal halide-nitrile complex used, the molar ratio of the complexing agent to the hydrocarbon and the temperature of the reaction. Usually, however, formation of the complex between the straight-chain vinyl aromatic hydrocarbons and the noble metal halide-nitrile complex will be complete in less than 30 minutes.

The final complex between the straight-chain vinyl aromatic hydrocarbons and the metal halide-nitrile complex is in most instances, at least partially soluble in the remaining uncomplexed hydrocarbons and the aromatic solvent at ordinary temperatures. This final complex may be precipitated either by cooling to a temperature at which precipitation takes place or by use of a hydrocarbon anti-solvent which forces the solid final complex out of solution. Particularly useful hydrocarbon anti-solvents are the aliphatic hydrocarbons, especially the acyclic paraffin hydrocarbons, though naphthenic hydrocarbons are also useful. Because of its low boiling point, petroleum ether is readily separated from the solution resulting after precipitation of the complex which is a desirable characteristic of the hydrocarbon anti-solvent. Of course, combination of lowered temperatures and an anti-solvent may be used to effect precipitation of the final complex.

After the process of the present invention has been completed with respect to the formation and precipitation of the straight-chain vinyl aromatic hydrocarbon-noble metal halide-nitrile complex, this complex may be separated from the remaining solution by decantation, by various filtration means, or any other means. The recovered liquid may then be subjected to ordinary fractional distillation or to solvent extraction or any other such means to separate the non-straight-chain vinyl aromatic hydrocarbons from the solvent used in effecting solution of the noble metal halide-nitrile complex. The recovered precipitate is then treated to release the complexed straight-chain vinyl aromatic hydrocarbon. Such treatment may take the form of heating, but preferably will take the form of a displacement type reaction in which the complexed straight-chain vinyl aromatic hydrocarbons are displaced in favor of some other readily complexable compound such as a low molecular weight olefinic hydrocarbon, i.e., ethylene, by contacting the precipitate either in solid form or dispersed and/or dissolved in a suitable solvent, with such a low molecular weight olefin hydrocarbon.

In order to further describe as well as to illustrate the present invention, the following examples are presented. These examples are in no manner to be construed as limiting the present invention.

Example I

A complex comprised of palladous chloride and benzonitrile was prepared by heating 200 grams of palladous chloride with 3000 cc. of aniline-free benzonitrile, to 100° C., cooling to room temperature (25–26° C.) and then adding petroleum ether to the solution to cause precipitation of the palladous chloride-benzonitrile complex. This complex was washed on a filter with additional petroleum ether and then dried. Approximately 50 grams of this complex (0.13 mole) was then dissolved in 1000 cc. of benzene. To this solution, 158 grams of a hydrocarbon mixture comprised of 79.54 grams (0.674 mole) of vinyl toluene and 78.46 grams (0.665 mole) of alpha-methyl styrene was added. This mixture was cooled to about 0° C. at which temperature a finely divided precipitate began to settle out. Cold petroleum ether was then added to enhance precipitation. The precipitate was then separated from the remaining solution by filtration and then washed with additional cold petroleum ether. The precipitate was found to contain 12.51 grams (0.106 mole) of vinyl toluene and essentially no alpha-methyl styrene. These results indicate an 81.6% utilization of available palladous chloride-benzonitrile complex with an essentially 100% selectively.

Example II

Approximately 50 grams (0.13 mole) of a complex palladous chloride and benzonitrile prepared as described in Example I was dissolved in one liter of benzene. To this solution was then added 158 grams of the vinyl aromatic hydrocarbon mixture described in Example I. The resulting mixture was cooled to about 0° C. and cold petroleum ether added. The mixture was then filtered to remove the precipitate which was washed with additional cold ether. The precipitate was found to contain 12.76 grams of vinyl toluene which represents an 83.1% utilization of the available palladous chloride-benzonitrile complex. No alpha-methyl styrene was found in the precipitate.

The above examples demonstrate the high selectivity which the noble metal halide-nitrile complexes have for straight-chain vinyl aromatic hydrocarbons. In addition, the examples illustrate a high utilization of the available complex for reaction with the straight-chain vinyl aromatic hydrocarbons.

The amount of noble metal halide-complex used in the separation of straight-chain vinyl aromatic hydrocarbons from non-straight-chain vinyl aromatic hydrocarbons in accordance with the present invention will vary considerably depending upon the degree of separation desired, the particular complex used, and the particular vinyl aromatic hydrocarbons in the mixture to be separated. Generally, the amount of metal halide-nitrile complex used will not be less than 0.5 nor more than 5 moles per mole of straight-chain vinyl aromatic hydrocarbon. However, the complex usually reacts with the straight-chain vinyl aromatic hydrocarbons in a mole per mole ratio. As a result of the difficulty of getting complete contact of a complex with the straight-chain vinyl aromatic hydrocarbons, a 100% utilization of the available complex is seldom obtained, however. Therefore, it is usually preferred to use an amount of complex in excess of the 1:1 mole ratio of complex straight-chain vinyl aromatic hydrocarbon. Such amount preferably is that which will cause a 1.2 to 2.0 mole ratio of complex to straight-chain vinyl aromatic hydrocarbons within the vinyl aromatic hydrocarbon mixture to be separated.

What is claimed is:

1. A process for the separation of straight-chain vinyl aromatic hydrocarbons from non-straight-chain vinyl aromatic hydrocarbons which comprises contacting a mixture of said hydrocarbons with a complex comprised of a halogen salt of a noble metal and a nitrile, thereby forming a second complex of said nitrile, said halogen salt of a noble metal and the straight-chain vinyl aromatic hydrocarbons of said mixture.

2. The process of claim 1 wherein said complex comprised of a halogen salt of a noble metal and a nitrile is dissolved in an inert aromatic hydrocarbon solvent.

3. The process of claim 2 wherein said inert aromatic hydrocarbon solvent is selected from the group consisting of benzene, toluene, xylenes, ethylbenzene and mixtures thereof.

4. The process of claim 1 wherein the mixture of straight-chain vinyl aromatic hydrocarbons and non-straight-chain vinyl aromatic hydrocarbons is contacted with said complex at a temperature within the range of 0 to 60° C.

5. The process of claim 1 wherein the halogen of said halogen salt of a noble metal is one selected from the group consisting of chlorine and fluorine and wherein said noble metal is one selected from the group consisting of platinum and palladium.

6. The process of claim 1 wherein said halogen salt of a noble metal is selected from the group consisting of platinous chloride and palladous chloride.

7. The process of claim 1 wherein said nitrile is an aromatic nitrile having no more than 1 alkyl substituent of no greater than 3 carbon atoms and in which the substituent containing the nitrile group has no more than 3 carbon atoms.

8. The process of claim 7 wherein the aromatic nitrile is benzonitrile.

9. The process of claim 1 wherein said nitrile is an aliphatic nitrile of no greater than 10 carbon atoms per molecule.

10. The process of claim 1 wherein the amount of said complex of a halogen salt of a noble metal and a nitrile is such as to cause a ratio of 0.5 to 5 moles of said complex per mole of said straight-chain vinyl aromatic hydrocarbons in said mixture of hydrocarbons.

References Cited
UNITED STATES PATENTS

| | | | |
|---|---|---|---|
| 2,458,067 | 1/1949 | Friedman et al. | 260—669 |
| 2,973,394 | 2/1961 | Atkinson et al. | 260—669 |
| 3,217,051 | 11/1965 | Rubinstein et al. | 260—669 |
| 3,217,052 | 11/1965 | Meek et al. | |

DELBERT E. GANTZ, *Primary Examiner.*

C. E. SPRESSER, JR., *Assistant Examiner.*

U.S. Cl. X.R.

260—674